April 22, 1969
R. W. DURIE
3,439,742
METHOD OF PRODUCING HYDROCARBONS FROM
AN UNDERGROUND FORMATION
Filed Sept. 29, 1966
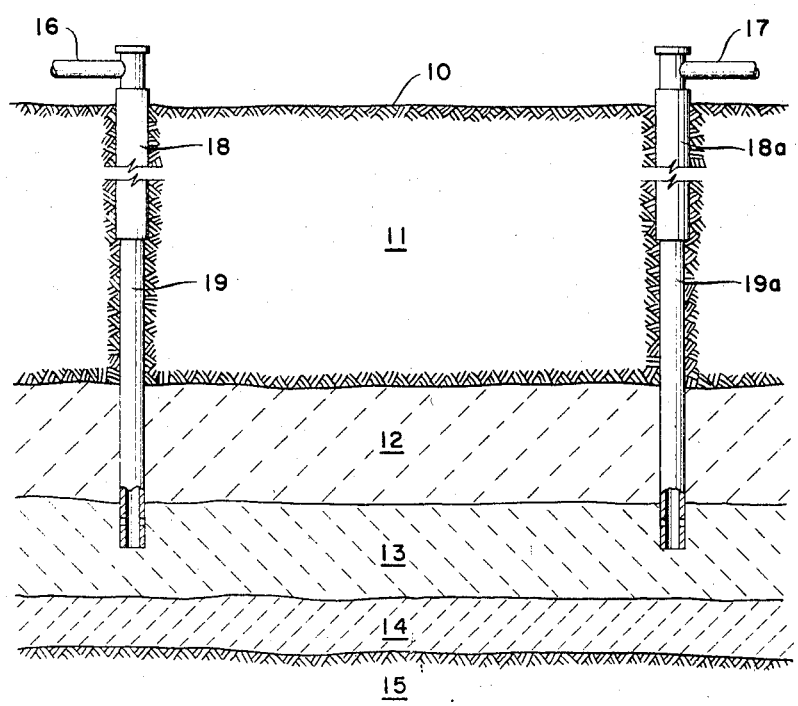
INVENTOR:
ROBERT W. DURIE
BY:
HIS AGENT United States Patent Office 3,439,742
Patented Apr. 22, 1969

3,439,742
METHOD OF PRODUCING HYDROCARBONS
FROM AN UNDERGROUND FORMATION
Robert W. Durie, Ottawa, Ontario, Canada, assignor to
Shell Oil Company, New York, N.Y., a corporation of
Delaware
Filed Sept. 29, 1966, Ser. No. 582,867
Claims priority, application Canada, Jan. 17, 1966,
950,055
Int. Cl. E21b 43/20
U.S. Cl. 166—272
14 Claims

ABSTRACT OF THE DISCLOSURE

A method of producing hydrocarbons from formations containing both water and hydrocarbons having a viscosity equal to or greater than the viscosity of water comprising penetrating with injection and production wells said formations which also contain more than 10 pore volume percent of water and injecting through the injection well a fluid under pressure lower than the pressure required to cause fracturing of the formation until communication with a production well is established, followed by injecting through the same well a hot inert fluid and producing hydrocarbons through the production well.

---

The present invention relates to a method of recovering hydrocarbons from an underground formation containing hydorcarbons of which the viscosity is greater than the viscosity of water at the same temperature, and in particular, greater than 10 poises at the temperature of the formation.

Specifically, the present invention relates to the recovery of hydrocarbons from tar sands, consisting of sand in which the pores contain very viscous hydrocarbons. Recovery of these hydrocarbons of which the viscosity is in the order of 10,000 poises at the temperature of the formation, is extremely difficult by conventional methods.

It has previously been proposed to excavate these tar sands and process the material thus excavated so as to separate the hydrocarbons from the sand. Such method, however, is only applicable when dealing with shallow formations. In deeper formations it may be possible to produce hydrocarbons from the formations by treating them in situ by thermal methods, such as by injecting oxygen-containing material which reacts with part of the hydrocarbons, thereby generating heat which lowers the viscosity of the rest of the hydrocarbons, or by injecting a hot medium, such as steam or hot water, for decreasing the viscosity of the hydrocarbons. The hydrocarbons having been heated to a temperature at which their viscosity is sufficiently reduced to allow them to flow through the pores of the formation, will subsequently flow under gravity in said pores, to a production well at a lower level and be lifted therein to the surface by suitable means (such as a well pump).

The present invention relates to the use of hot inert fluids in underground formations containing water in the pores of the formation for recovering hydrocarbons of high viscosity therefrom particularly hydrocarbons of very high viscosity. The water may be partly or wholly in connate form. The term "hot fluid" is used here and hereinafter to mean a gas, a liquid, a mixture of a gas and a liquid or a mixture of gases and liquids having a temperature which is higher than the temperature of the formation in which it is to be injected. An inert fluid is a gas, liquid, mixture of gas and liquid or a mixture of gases and liquids which does not react with the hydrocarbons present in the formation into which it is to be injected.

In order to increase the permeability of such formations to the hot inert fluid to be injected, it has previously been proposed to establish communication between injection and production wells in such formations by producing a fracture by the application of high pressures. It has now been found according to the process of this invention, however, that in some formations this procedure will not always be necessary and that under certain circumstances the rather costly application of a fracture can be omitted. The method according to this invention may also be applied in formations where establishment of the wells by producing a fracture between communication is either not possible nor practicable.

According to the process of this invention, hydrocarbons may be recovered from an underground formation in which the hydrocarbons present have a viscosity equal to or greater than the viscosity of water at the same temperature, water being persent in the pores of the formation wherein the water saturation of the pores has a relatively low value over the upper region of the formation and has a relatively high value in the lower region of the formation, which comprises arranging at least one injection well and at least one production well each well penetrating into the lower region of the formation, providing a communication between the said injection and production wells through the pores of this lower region by injecting a fluid down the injection well or wells into this lower region at a pressure less than that necessary to produce a fracture in the formation at the injection level, subsequently injecting a hot inert fluid down the injection well at substantially the same level as the previous fluid, and recovering the hydrocarbons from the formation through the said production well or wells.

The fluid which is first injected into the lower region of the formation at a pressure lower than necessary to produce a fracture in the formation at that level so as to provide a communication between the wells through the pores of this lower region during the first part of this process may either be the same as the hot inert fluid which is injected during the second stage of this method or may be different therefrom. In the latter case, this first fluid injected into the formation may either be hot and inert, such as hot water, or be chosen such, so as to react with the hydrocarbons in the formation and be an oxygen-containing gas, such as air, which is injected either in a hot or in a cold condition.

The mobility of the water present in the lower region of the formation is greater than the mobility of the water present in the upper region thereof, since the water saturation of the lower region is greater than the water saturation of the upper region. Consequently the resistance to flow encountered by the fluid injected in the first part of the process and the water will be appreciably smaller in the lower region of the formation than in the upper region of the formation. Injection of this first fluid into the lower region of the formation will thus be possible without the necessity of producing a fracture at this level. In passing through the lower region, the first injected fluid will, when it is a hot inert fluid, transfer its heat to the formation, or when being a fluid which reacts with the hydrocarbons, create heat in situ which heat is transferred to the formation. In both these cases, the hydrocarbons present in the lower region of the formation will be heated, whereby the viscosity thereof will be reduced which will allow the drainage of these hydrocarbons to the bottom of the formation and allow them to recover via the production well(s). Thus, there will be formed a hot passageway through the lower region of the formation without the necessity for producing a fracture.

In the second stage of the recovery process of this invention a hot inert fluid is passed through the hot passageway previously produced in the lower region of the formation. Although a hot inert liquid (such as hot water) may be applied as injection fluid in this second stage of the process, it is preferred to use a hot inert condensable gas (such as steam).

The invention will now, by way of example, be further described with reference to the drawing.

In the drawing, there is shown a vertical section through that portion of the earth's crust which includes a hydrocarbon-containing underground formation. Two wells penetrate into this latter hydrocarbon-containing underground formation. The formation from which hydrocarbons are to be produced is, in the present example, a tar sand formation having zones 12–14 lying between cap and base rock 11 and 15, respectively, which are of low permeability. An injection well 19 penetrates from the surface 10 into the subsurface, through the caprock 11 and into the tar sand formation having zones 12, 13 and 14. The well is, where necessary, lines with casing (not shown) which casing is cemented to the subsurface over suitable intervals so as to prevent any leakage of fluids along the outer side of the casing. The well 19 is designed as an injection well and provided with all the equipment (such as wellhead, injection tubing, packers, liner) suitable for the purpose as well as an adjustable sleeve 18 so that injection well can be adjusted to communicate with zones 12, 13 or 14. Since all this equipment is known per se, it has for sake of simplicity neither been described in detail, nor been shown in the drawing.

A conduit 16 communicates at one end thereof to the top of the injection well 19. The other end of conduit 16 communicates to a source of hot inert fluid under pressure (not shown).

The second well, shown in the drawing, is a production well 19a. This well is, like the well 19, drilled from the surface 10 into the subsurface and penetrates the caprock 11 and into the production recovery formation zones 12–14. In addition, again like well 19, well 19a is, where necessary, lined with casing (not shown) which casing is cemented to the subsurface over suitable intervals so as to prevent any leakage of fluids along the outer side of the casing. All the necessary equipment (such as wellhead, production tubing, packers, pumping means, liner, perforations) which is required in the well 19a for operating this well as a production well is arranged in this well. The production well 19a is also provided with an adjustable sleeve 18a. However, since this equipment is known per se, it has for sake of simplicity neither been shown in the drawing, nor been described in detail.

A conduit 17 leads from the top of the well 19a to a pipeline (not shown) which transports the hydrocarbon material to a place where it is further treated.

The pores of the production recovery formation zones 12–14 are not exclusively occupied by the viscous hydrocarbons. Water is also present therein. In the upper region 12 of the production recovery formation zones 12–14, the water saturation ranges from about 10 to 30 volume percent of the pore space. The water may be in the form of connate water which adheres to the grains of the sand due to capillary forces.

In the lower region of combined zones 13 and 14 of the formation zones 12–14, the water saturation of the pore space is greater than in the upper region 12. This lower region of combined zones 13 and 14 can be divided into two parts, a lower part 14, in which the pore space is fully saturated with water, and an upper part 13, in which the water saturation of the pore space varies with depth. At the top of the upper part 13 of the region of combined zones 13 and 14, the water saturation of the pore space is approximately equal to the water saturation in the upper region 11 and at the bottom of this upper part 13 the pore space is nearly fully saturated with water. Between these two extremities, the water saturation increases with depth.

According to the invention, the interiors of both wells 19 and 19a at least communicate with the pores of the lower region of zones 13 and 14, being the region where the water saturation is higher than the water saturation in the upper region. In the particular example shown in the drawing, the interiors of the wells 19 and 19a communicate with the pores of the upper part 13 of the lower region of combined zones 13 and 14, being the part of the formation where the water saturation is higher than the water saturation in the upper region but lower than 100%. Preferably, the wells 19 and 19a communicate with that part of the formation, where the water saturation is greater than 70 volume percent.

Since the mobility of the first fluid to be injected, which fluid is in this particular example formed by steam, is smallest in region 12 where the water saturation is smallest, and increases with increasing water saturation, the injection of steam in the region 13–14 will be more profitable than in the region 12, since greater amounts of steam may be injected at the same pressure level when injecting into region 13–14 than in region 12. The pressure at which the steam is injected into the region 13–14, is less than the pressure necessary for fracture of the formation when measured at the injection level of the steam. It should be noted that fracturing of the formation 12–14 would be required when it is desired to inject sufficiently great amounts of the steam into the region 12 of the formation 12–14. The steam after being injected via the conduit 16 into the well 19, enters the pores of the upper part of region 13–14, and subsequently filters through these pores towards the production well 19a, thereby displacing water and hydrocarbons towards this well, and partly heating the formation 12–14 and the contents thereof. This latter heating decrease the viscosity of the hydrocarbons present in the neighborhood of the flow of this first injected fluid, which results in a reduction of the resistance to flow encountered by this fluid when travelling through the pores of the formation.

Once the fluid used in the first stage of the process has reached the production well, a hot passageway has been established between the wells 19 and 19a without fracturing being necessary. It of course arrives at the production well at a lower temperature than that at which it was injected. The fluid passing through this passageway which is within the pores of part 13 of the lower region 13–14, entrains hydrocarbon material with reduced viscosity from locations adjacent to this passageway and delivers this to the production well. The heat transferred from the fluid to the formation particles, is passed on by convection to locations lying at some distance from the passageway forming the communication between the wells 19 and 19a, thereby decreasing the viscosity of the hydrocarbons occupying the pores of these locations, which hydrocarbons then flow—provided that such locations are situated at the same or at a higher level than the passageway—towards the passageway and are then entrained by the flow of fluid towards the production well 19a.

Instead of applying steam in the first part of the process as a fluid for creating a hot passageway, there may also be used an oxygen-containing gas, such as air. This gas will react with part of the hydrocarbons present in the part 13 of the region 13–14, and the heat resulting from this reaction will form a hot passageway, in a similar way to the use of steam, through the pores of the part 13, which passageway will extend between the wells 19 and 19a.

Similar, hot water may be used for the creation of the desired hot passageway through the region 13–14 and extending between the wells 19 and 19a.

After the formation of the hot passageway extending between the wells 19 and 19a and arranged within the part 13 of the lower region 13–14 the second stage of the method, during which the hydrocarbons contained in the region 12 will be recovered, is initiated. In the specific example described here with reference to the drawing, the hot inert fluid which is applied for the recovery of the hydrocarbons is of the same type but not necessarily identical to the fluid applied in the first stage. Thus, if the injection of steam is continued after the first stage of the operation is over, this steam will penetrate into the pores of the formation 12–14 in a vertical direction, and condense against the relatively cold overlying parts of the formation. Heat will thereby be delivered to said overlying parts, whereby the viscosity of the hydrocarbons present therein will be decreased with the result that the heated hydrocarbons drain down and are removed via the hot passageway within the part 13 of the lower region 13–14 and the production well 19a. The same applies when using condensable gases other than steam. Because of the excellent vertical heat transport of condensable gas, the application of hot inert condensable gas will be more favorable than the application of hot inert liquid, such as hot water, in the second stage of the operation.

Instead of using a hot inert gas, there may also be applied a mixture of hot inert liquid and a hot inert condensable gas (such as steam mixed with water) for heating up the formation 12–14.

If only steam is injected, it may be either dry or superheated on entering the region 13–14 of the formation 12–14.

The injection of steam via the well 19 is continued until the upper region 12 of the formation has been heated to a temperature which is sufficiently high to lower the viscosity of the hydrocarbons present therein to a degree which enables the drainage of these hydrocarbons to the production well 19a. The hydrocarbons and the fluid may be lifted in the well 19a in one of the usual manners, e.g. by means of a well pump arranged in the well 19a.

Notwithstanding the fact that in the particular example as shown in the drawing, the well 19 has been completed so as to communicate with the upper part 13 of the lower region 13–14, this well may, with the same effect, be completed so as to communicate with the lower part 11 of the lower region 13–14. Further the well 19 could be completed at a level within the upper region 12, provided that some passageway is formed (e.g., a fracture system) for guiding the first fluid to be injected and subsequently the hot inert fluid from the well 19 into the lower region 13–14.

The well 19a may be completed in the same manner as described herein above with reference to well 19. However, the wells 19 and 19a need not to be completed at a common level.

If desired the function of the wells may be interchanged during the method according to the invention.

Although in the example as shown in the drawing, only two wells have been shown for carrying out the method according to the invention, the present invention is by no means limited thereto. Any number of wells and any type of well pattern may be applied for carrying out the method according to the invention.

It will be obvious that various modification and substitutes of equivalent steps may be made without departing from the spirit of the present invention, and that the specific steps described herein are merely illustrative.

Further it will be understood that the present invention is also applicable in recovering hydrocarbons from hydrocarbon-containing formations in which the lower region 13–14 only consists of part 14 or part 13.

Although the formation 12–14 is, in the example shown in the drawing, substantially horizontally located, it will be understood that the method according to the invention may be applied with the same results to hydrocarbon-containing formations which are of the slanted type.

I claim as my invention:

1. Method of producing hydrocarbons from an underground formation containing water and hydrocarbons having a viscosity in the range of from about equal to or about greater than the viscosity of water at the same temperature, water being present in the pores of the formation, the water saturation of the pores having a relatively low value over the upper region of the formation and having a relatively high value over the lower region of the formation, which method comprises:
   (a) arranging at least one injection well and at least one production well, both penetrating into the formation;
   (b) completing these wells such that they communicate only with the lower region of the formation;
   (c) providing a communication between the wells through the pore space of this lower region by injecting a fluid selected from the group consisting of cold water, hot water, steam, an oxygen-containing gas and mixtures thereof via the injection well into this lower region under a pressure lower than the fracturing pressure at the injection level;
   (d) subsequently injecting a hot inert fluid via the injection well at substantially the same injection level; and,
   (e) producing fluids containing hydrocarbons out of the formation via said production well.

2. Method according to claim 1, wherein the lower region of the formation consists of a lower part which is substantially saturated with water, and an upper part in which the water saturation increases with depth, the injection well and the production well being completed such that they are in fluid communication with at least the upper part of the lower region.

3. Method according to claim 1, wherein the fluid used in stage (c) of the method comprises a fluid selected from the group consisting of steam and hot water and mixtures thereof.

4. Method according to claim 3, wherein the fluid used in stage (d) is selected from the group consisting of steam, hot water and mixtures thereof.

5. Method according to claim 1 wherein the fluid used in stage (d) is selected from the group consisting of steam, hot water and mixtures thereof.

6. Method according to claim 1, wherein the fluids are injected into the formation at a level at which the water saturation of the pore space is between 10 and 100 volume percent.

7. Method according to claim 1, wherein the fluids are injected into the formation at a level at which the water saturation of the pore space is greater than 10–30 volume percent.

8. Method according to claim 1, wherein the fluids are injected into the formation at a level at which the water saturation of the pore space is greater than 70 volume percent.

9. Method of producing hydrocarbons from an underground formation containing water and hydrocarbons having a viscosity in the range of from about equal to or about greater than the viscosity of water at the same temperature, water being present in the pores of the formation, the water saturation of the pores having a relatively low value over the upper region of the formation and having a relatively high value over the lower region of the formation, which method comprises:
   (a) arranging at least one injection well and at least one production well, both penetrating into the formation;
(b) completing these wells such that they communicate only with the lower region of the formation;
(c) providing a communication between the wells through the pore space of this lower region by injecting an oxygen-containing gas via the injection well into this lower region under a pressure lower than the fracturing pressure at the injection level;
(d) subsequently injecting a hot inert fluid via the injection well at substantially the same injection level; and
(e) producing fluids containing hydrocarbons out of the formation via said production well.

10. Method of producing hydrocarbons from an underground formation containing water and hydrocarbons having a viscosity in the range of from about equal to or about greater than the viscosity of water at the same temperature, water being present in the pores of the formation, the water saturation of the pores having a relatively low value over the upper region of the formation and having a relatively high value over the lower region of the formation, which method comprises:
(a) arranging at least one injection well and at least one production well, both penetrating into the formation;
(b) completing these wells such that they communicate only with the lower region of the formation;
(c) providing a communication between the wells through the pore space of this lower region by injecting an oxygen-containing gas via the injection well into this lower region under a pressure lower than the fracturing pressure at the injection level;
(d) subsequently injecting a hot inert condensable gas via the injection well at substantially the same injection level; and,
(e) producing fluids containing hydrocarbons out of the formation via said production well.

11. Method of producing hydrocarbons from an underground formation containing water and hydrocarbons having a viscosity in the range of from about equal to or about greater than the viscosity of water at the same temperature, water being present in the pores of the formation, the water saturation of the pores having a relatively low value over the upper region of the formation and having high value over the lower region of the formation, which method comprises:
(a) arranging at least one injection well and at least one production well, both penetrating into the formation;
(b) completing these wells such that they communicate only with the lower region of the formation;
(c) providing a communication between the wells through the pore space of this lower region by injecting an oxygen-containing gas via the injection well into this lower region under a pressure lower than the fracturing pressure at the injection level;
(d) subsequently injecting a hot inert fluid selected from the group consisting of steam, hot water and mixtures thereof via the injection well at substantially the same injection level; and,
(e) producing fluids containing hydrocarbons out of the formation via said production well.

12. Method of producing hydrocarbons from an underground formation containing water and hydrocarbons having a viscosity in the range of from about equal to or about greater than the viscosity of water at the same temperature, water being present in the pores of the formation, the water saturation of the pores having a relatively low value over the upper region of the formation and having a relatively high value over the lower region of the formation, which method comprises:
(a) arranging at least one injection well and at least one production well, both penetrating into the formation;
(b) completing these wells such that they communicate only with the lower region of the formation containing at least 10 pore volume percent of water;
(c) providing a communication between the wells through the pore space of this lower region by injecting a fluid selected from the group consisting of cold water, hot water, steam and an oxygen-containing gas via the injection well into this lower region under a pressure lower than the fracturing pressure at the injection level;
(d) subsequently injecting a hot inert fluid via the injection well at substantially the same injection level; and,
(e) producing fluids containing hydrocarbons out of the formation via said production well.

13. The method of claim 12 wherein the fluid in stage (c) is hot water and the hot inert fluid in stage (d) is steam.

14. The method of claim 12 wherein the fluids in stages (c) and (d) are steam.

References Cited
UNITED STATES PATENTS

| | | | |
|---|---|---|---|
| 3,042,114 | 7/1962 | Willman | 166—40 X |
| 3,138,203 | 6/1964 | Weiss et al. | 166—11 X |
| 3,170,515 | 2/1965 | Willman | 166—11 |
| 3,193,008 | 7/1965 | Moore | 166—11 |
| 3,349,846 | 10/1967 | Trantham et al. | 166—11 |

STEPHEN J. NOVOSAD, *Primary Examiner.*

U.S. Cl. X.R.
166—303